(12) United States Patent
Sham et al.

(10) Patent No.: US 11,892,832 B2
(45) Date of Patent: Feb. 6, 2024

(54) LANE PATH MODIFICATION FRAMEWORK

(71) Applicant: Waymo LLC, Mountain View, CA (US)

(72) Inventors: Jeffrey Sham, San Jose, CA (US); Homero Menchaca Hernández, Sunnyvale, CA (US); Jeffrey Carlson, Mountain View, CA (US); Yulai Shen, Sunnyvale, CA (US); Ningshan Zhang, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 220 days.

(21) Appl. No.: 17/349,035

(22) Filed: Jun. 16, 2021

(65) Prior Publication Data
US 2022/0404823 A1 Dec. 22, 2022

(51) Int. Cl.
| | |
|---|---|
| *G05D 1/00* | (2006.01) |
| *G05D 1/02* | (2020.01) |
| *G06V 20/58* | (2022.01) |
| *G06V 20/56* | (2022.01) |

(Continued)

(52) U.S. Cl.
CPC ......... *G05D 1/0016* (2013.01); *G05D 1/0038* (2013.01); *G05D 1/0214* (2013.01); *G06V 10/235* (2022.01); *G06V 10/457* (2022.01); *G06V 20/58* (2022.01); *G06V 20/588* (2022.01)

(58) Field of Classification Search
None
See application file for complete search history.

(56) References Cited

U.S. PATENT DOCUMENTS

| | | | |
|---|---|---|---|
| 10,169,680 B1 * | 1/2019 | Sachdeva | G06N 3/045 |
| 10,509,413 B2 | 12/2019 | Mou | |
| 2010/0034426 A1 | 2/2010 | Takiguchi et al. | |

(Continued)

FOREIGN PATENT DOCUMENTS

CN 106297297 1/2017

OTHER PUBLICATIONS

Basavaraju, "Machine Learning Approaches to Road Surface Anomaly Assessment Using Smartphone Sensors," Thesis for the degree of Master of Science, Texas A&M University, School of Electrical Engineering, Aug. 2018, 63 pages.

(Continued)

*Primary Examiner* — Anne Marie Antonucci
*Assistant Examiner* — Jingli Wang
(74) *Attorney, Agent, or Firm* — Fish & Richardson P.C.

(57) ABSTRACT

Methods, systems, and apparatus, including computer programs encoded on a computer storage medium that generates lane path descriptors for use by autonomous vehicles. One of the methods includes receiving data that defines valid lane paths in a scene in an environment. Each valid lane path represents a path through the scene that can be traversed by a vehicle. User interface presentation data can be provided to a user device. The user interface can contain: (i) a first display area that displays a first visual representation of the sensor measurement; and (ii) a second display area that displays a second visual representation of the set of valid lane paths. User input modifying the second visual representation of the set of valid lane paths can be received; and in response to receiving the user input, the set of valid lane paths of the scene in the environment can be modified.

20 Claims, 6 Drawing Sheets

(51) Int. Cl.
*G06V 10/22* (2022.01)
*G06V 10/44* (2022.01)

(56) References Cited

U.S. PATENT DOCUMENTS

| | | |
|---|---|---|
| 2017/0242436 A1 | 8/2017 | Creusot |
| 2018/0136332 A1 | 5/2018 | Barfield et al. |
| 2018/0356819 A1 | 12/2018 | Mahabadi et al. |
| 2022/0082403 A1* | 3/2022 | Shapira .................. G01C 21/32 |

OTHER PUBLICATIONS

Du et al., "Predicting Freeway Work Zone Delays and Costs with a Hybrid Machine-Learning Model," Journal of Advanced Transportation, 2017, 9 pages.
Gil et al., "Classification of Images from Construction Sites Using a Deep-Learning Algorithm," 35th International Symposium on Automation and Robotics in Construction, 2018, 6 pages.
Nath et al., "Single-And Multi-Label Classification of Construction Objects Using Deep Transfer Learning Methods," Virtual, Augmented and Mixed: New Realities in Construction, Dec. 2019, 24:511-526.
Rengifo, "Detection and Classification of Anomalies in Road Traffic using Spark Streaming," Thesis for Master's degree, KTH Royal Institute of Technology, School of Electrical Engineering and Computer Science, 2018, 69 pages.

* cited by examiner

LANE PATH MODIFICATION FRAMEWORK

BACKGROUND

This specification relates to autonomous vehicles.

Autonomous vehicles include self-driving cars, motorcycles, trucks, buses and similar vehicles. Autonomous vehicles use a variety of on-board sensors and computer systems to detect nearby objects and use such detections to make control and navigation decisions.

SUMMARY

This specification describes a system implemented as computer programs on one or more computers in one or more locations that generates lane path descriptors for use by autonomous vehicles. More specifically, this specification describes a system that modifies lane path descriptors in response to user input. A lane path is a region of space traversable by an autonomous vehicle as it navigates through an environment; a lane path descriptor is data describing an associated lane path.

Particular embodiments of the subject matter described in this specification can be implemented so as to realize one or more of the following advantages.

The techniques described below can, in response to user input, alter lane path descriptors. Altering lane path descriptors enables autonomous vehicles to safely and efficiently traverse an environment. In addition, the altered lane path descriptors can be used to train one or more machine learning models used to navigate an autonomous vehicle, again enabling safe and efficient operation of an autonomous vehicle.

Further, the techniques described below can, in response to user input, alter lane path descriptors associated with lane paths on roadways that do not include lane markings. Since some roadways, especially in rural and suburban settings, do not include lane markings, altering lane path descriptors related to such environments based on user inputs helps enable autonomous vehicles to traverse such environments safely.

The techniques described below for altering lane path descriptors allow a user of the system to visualize the environment in which the lane path descriptors are being modified, thereby simplifying the process of altering lane path descriptors.

Additionally, the techniques described below can be used to improve the navigation of an autonomous vehicle by providing user interface presentation data to a user interface device to enable a user to identify in sensor data one or more road obstructions. This data can then be used to train a machine learning model that detects road obstructions, and that machine learning model can be deployed on-board the autonomous vehicle. A control system for the autonomous vehicle can use the predictions of this machine learning model to improve the navigation of the autonomous vehicle, i.e., by improving the ability of the control system to navigate the vehicle to take trajectories that avoid road obstructions and regions of the roadway that are inaccessible due to the road obstructions.

One aspect features receiving data that defines a set of valid lane paths in a scene in an environment. Each valid lane path represents a path through the scene that can be traversed by a vehicle. User interface presentation data can be provided to a user device and causes the user device to display a user interface. The user interface can contain: (i) a first display area that displays a first visual representation of the sensor measurement; and (ii) a second display area that displays a second visual representation of the set of valid lane paths. User input modifying the second visual representation of the set of valid lane paths can be received; and in response to receiving the user input modifying the second visual representation, the set of valid lane paths of the scene in the environment can be modified.

One or more of the following features can be included. Data representing one or more labels relating to a lane obstruction can be received. Data representing an altered lane path that avoids the lane obstruction can also be received. In response to receiving data representing an altered lane path, the set of valid lane paths of the scene in the environment can be modified. Each of the lane paths can be defined by a lane path descriptor that specifies: (i) a plurality of nodes that includes a start node and an end node; (ii) the start node represents the beginning of the lane path and the end node represents the end of the lane path; and (iii) one or more directed edges connecting the start node to the end node. The user input can add or remove at least one of the plurality of nodes. The user input can also modify the location of at least one node of the plurality of nodes. User input can be received that represents vertices of a polygon enclosing at least a portion of the sensor data; and in response to receiving the user input, the enclosed at least a portion can be associated with a label that identifies the enclosed portion as a measurement of a roadway obstruction. The first display area can display the first visual representation of the sensor measurement as a top-down representation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

To aid in safe and effective operation, an autonomous vehicle should have access to a set of possible paths, or "lane paths," that the autonomous vehicle can use to navigate through an environment.

A lane path can correspond to a path that follows a marked lane on a roadway, or to an unmarked path an autonomous vehicle might follow while navigating along the roadway. For example, when two lanes merge into a single lane, the lane path—that is, a preferred route for an autonomous vehicle—might stray from the marked lanes on the roadway. In addition, in some cases, lane markings are absent, especially on smaller suburban and rural roadways. An autonomous vehicle must be able to operate safely in such environments, making lane paths important to safe operation.

Further, valid lane paths can change over time. For example, if an obstruction is added to the roadway, such as cones around a construction zone, lane paths through the construction zone must be adjusted. Similarly, a pothole might cause an existing lane path to become untraversable, requiring an alteration to the lane path.

Lane paths can also change in response to permanent changes to the navigable environment. For example, if a street is added, lane paths can be added that traverse that street. Conversely, if a street is blocked, or changed from two-way to one-way, alterations to lane paths can be required.

For the reasons listed above, a system that modifies representations of lane paths, called "lane path descriptors," can lead to improvements in the safe operation of an autonomous vehicle. Once properly established, the lane path descriptors can be used to train one or more machine learning models used to navigate an autonomous vehicle. For example, a machine learning model trained using lane path descriptors can process data characterizing a scene in a drivable environment and can predict valid lane paths in the scene that are available to the autonomous vehicle and to other vehicles in the scene.

Figure 1:
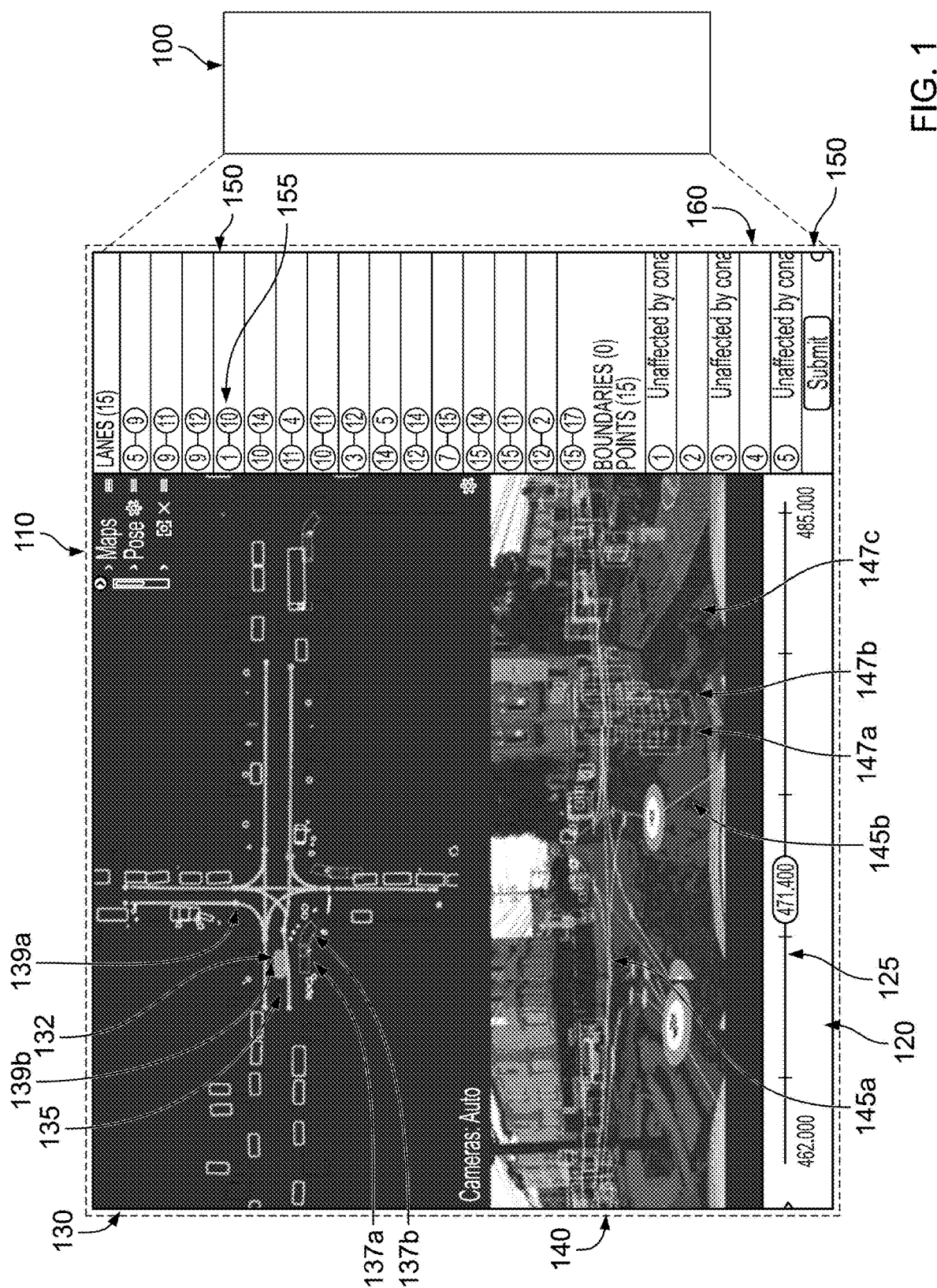
FIG. 1 is an illustration of a user interface generated by a system that modifies lane path descriptors.

FIG. 1 is an illustration of a user interface generated by a system that modifies lane path descriptors. The illustration is based on user interface presentation data generated by a lane path management system that modifies lane path descriptors. The lane path management system, such as the lane path management system described with reference to FIG. 2, can generate user interface presentation data and provide the user interface presentation data to a user device to cause the user device to display a user interface that represents the user interface presentation data. The user interface presentation data 110 can include data describing one or more panes that allow a user to review and alter lane paths and information related to lane paths.

In FIG. 1, one pane 140 displays user interface presentation data that includes representations of sensor data collected by one or more autonomous vehicles that have traversed, or are currently traversing, an environment, or by other sensors measuring the environment. This user interface presentation data represented in this pane enable a user who is reviewing the lane paths to understand the paths in the context of the environment. The user interface presentation data displayed in this pane includes multiple lane paths including the lane paths marked 145a and 145b. The user interface presentation data also includes representations of obstructions including 147a, 147b and 147c. In this example, the road cones 147a, 147b have been marked by bounding boxes.

A second pane 130, includes a representation of user interface presentation data produced by the system 100, represents the area for which sensor data is illustrated in pane 140. The pane is a top-down presentation of the user interface presentation data that represents sensor data gathered from a scene in an environment. The representation includes depictions of multiple elements of the scene, including representations of lane paths (e.g., 135) and buildings. It also represents a self-driving car 132. The pane 130 also includes a depiction of obstructions such as road cones 137a, 137b and multiple additional obstructions, including 137c. The boundaries of obstructions are marked by polygons that can be generated based on input submitted by users of the system, as described below.

The second pane 130 also illustrates nodes (including 139a, 139b) that indicate points within a lane path. As described further below, the lane path management system 100 enables a user to interact with the displayed user interface presentation data, for example, to indicate changes to the location of nodes in the lane path, and in response to receiving an indication that a node has moved, the system can alter the geometry of a lane path that contains the node. In addition, the lane path management system 100 can enable the user to interact with the displayed user interface presentation data to add and delete nodes, and in response to receiving node additions or deletions, the system can alter the lane path accordingly, as described in additional detail in reference to FIG. 3. The lane path management system 100 can enable interaction with the displayed user interface presentation data through mouse clicks, drag and drop, keyboard input (including hotkeys), voice input, gestures and other user interface technologies.

A third pane, 120, below the first pane 140, displays user interface presentation data that includes a slider widget 125. When a user interacts with the user interface presentation data including the slider widget 125, in response to receiving an indication that the user modified the position of the slider widget 125, the system can receive an indication of a time indicated in the user interface presentation data, and create new user interface presentation data reflecting sensor data at the time indicated by the slider widget 125, and a representation of the sensor data, also at the time indicated by the slider widget 125.

A fourth pane 150 illustrates user interface presentation data that represent a listing of lane paths as indicated by the nodes that form them. For example, lane path 155 connects node 1 to node 10. As a user interacts with the displayed user interface presentation data (e.g., in pane 130) to reconfigure lane paths by altering the node configuration (for example, by dragging the representation of a displayed node to a new location), the lane path management system 100 can receive indications of the alterations, and update the user interface presentation data displayed in pane 150.

A fifth pane 160 can illustrate a listing of nodes displayed in pane 130. As a user interacts with the displayed user interface presentation data by indicating, in pane 130, the addition of a node, the lane path management system 100 can receive an indication of the addition, and update the user interface presentation data displayed in pane 160 to include the additional node. The user interface presentation data can enable the "add node" action by, for example, including instructions that: (i) cause a mouse right-click action to result in the display a menu that includes "add node," and (ii) when the "add node" menu choice is selected, creating and transmitting to the system an indication that a new node should be created.

A user interface element 170 included in the user interface presentation data, such as a submit button, when selected by a user, can cause the lane path management system 100 to receive an indication of updates made by a user, such as changes to node positions. In response, the lane path management system 100 can, for example, update lane paths, as described in additional detail below, and update the user interface presentation data displayed on the user interface device.

The lane path management system performs modification of lane paths responsive to actions taken by a user when interacting with a user interface that displays the user interface presentation data generated by the lane path management system. For example, if a user relocates a node (e.g., 139a, 139b) in user interface pane 130, the lane path management system can update the associated lane path descriptor stored in the lane path management system. The lane path management system can, in addition, deliver the updated lane path descriptor to a training system, as described further in reference to FIG. 2.

In another example, in response to receiving an indication that a user relocated a node (e.g., 139*a*, 139*b*) in the user interface, the lane path manger system can generate updated user interface presentation data. For example, if the user adds a node to a lane path in pane 130, in response to that addition, the lane path management system can generate user interface presentation data that contains an updated set of node connections, which can be rendered by a user interface device, for example, in pane 150. The user interface presentation data generated by the lane path management system can further include an updated list of nodes, for example, as rendered in pane 160.

In another example, in response to receiving an indication that a user marked the presence of an obstruction in pane 130, for example, by drawing a polygon around the boundaries of the obstruction, the lane path management system can update sensor data by adding, for example, the boundaries of the obstruction and an indication of the type of obstruction. The lane path management system, when subsequently creating user interface presentation data, can include in the data an indication of the obstruction, its type and its boundaries.

Figure 2:
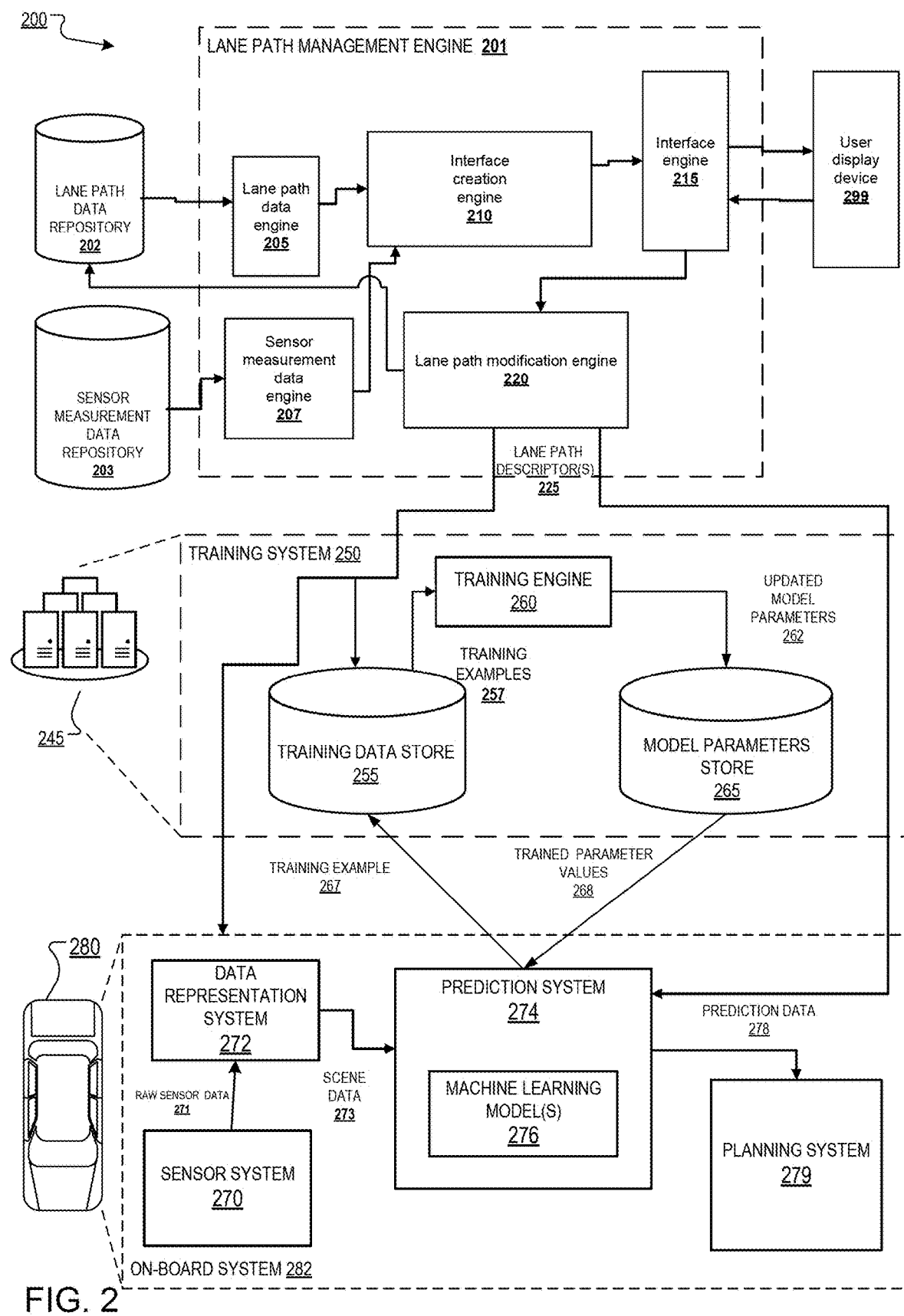
FIG. 2 is a block diagram of an example lane path modification system.

The lane path management system 100 described in this specification can generate user interface presentation data that includes all panes illustrated in FIG. 1, a subset of the illustrated panes, a subset of the illustrated pane augmented with additional data, or alternate panes configured to perform analogous function FIG. 2 is a block diagram of an example lane path management system. The lane path management system 200 is an example of a system implemented as computer programs on one or more computers in one or more locations in which the systems, components, and techniques described below are implemented.

The lane path management system 200 includes a lane path management engine 201 and a lane path repository 202 that stores modified and unmodified lane path descriptors. Lane path descriptors contain data specifying lane paths, as described below.

The lane path management engine 201 can improve the operation of an autonomous vehicle 280 by training one or more machine learning models used by an autonomous vehicle 280 and deploying the model(s) to the autonomous vehicle 280, or by providing lane path descriptors to the autonomous vehicle 280, as described below.

The lane path management engine 201 can receive indications of altered lane paths, and provide altered lane path descriptors 225 specifying the altered lane paths to a training system 250 for use in training one more machine learning models that guide the operation of an on-board system 282 on the autonomous vehicle 280. The lane path management engine 201 can also provide altered lane path descriptors 225 directly to the on-board system 282 for use in navigating the autonomous vehicle 280.

The lane path management engine 201 can access data from external repositories, such as a lane path data repository 202 and a sensor measurement data repository 203. As described in more detail below, the lane path management engine 201 can deliver lane path descriptors 225, including modified and unmodified lane paths, to both the training system 250 and to the on-board system 282. (The training system 250 and the on-board system 282 are described below.) The lane path management system 200 can also update sensor measurement data in the sensor measurement data repository 203, for example, in response to receiving an indication that sensor data corresponds to a lane obstruction.

The lane path management engine 201 can include various subcomponents, including a lane path data engine 205, a sensor measurement data engine 207, an interface creation engine 210, an interface engine 215 and a lane path modification engine 220. Together, these subcomponents enable the lane path management system to determine lane paths, create user interface presentation data related to the lane paths for display on a user device, receive data indicating changes to lane paths, and deliver the modified lane path descriptors to other components of the system.

The lane path management engine 201 can, in response to receiving an indication that a scene in an environment should be reviewed, retrieve the relevant lane path descriptors and sensor measurement data, as described further below. For example, the lane path management engine 201 can receive an indication that sensor data relevant to a region has changed, and in response, the lane path management engine 201 can retrieve the sensor data and the lane path descriptors relevant to the scene. The indication can be received from a user or from one or more repositories associated with the lane path management engine 201.

The lane path data engine 205 retrieves lane path descriptors from one or more lane path data repositories 202. Lane path descriptors describe lane paths available in the environment. For example, lane path descriptors can include the coordinates of nodes that define a lane path, and the connections among nodes. (Lane path descriptors are also described with reference to FIG. 3.)

The lane path data repositories 202 can be implemented as databases, such as relational databases, file systems, other conventional data repository technologies or any combination of data repository technologies.

The sensor measurement data engine 207 retrieves sensor data from one or more sensor measurement data repositories 203. Sensor measurement data can include any data acquired from sensors associated with an autonomous vehicle or from other sensors present in the environment. Sensors can include LIDAR, cameras, video cameras, ultrasound, and so on.

The sensor measurement repositories 203 can be implemented as databases, such as relational databases, file systems, other conventional data repository technologies or any combination of data repository technologies. Sensor data can also be retrieved directly from an autonomous vehicle 280.

The interface creation engine 210 can integrate sensor data acquired from the sensor measurement data engine 207, lane path descriptors acquired from the lane path data engine 205, and (optionally) other data available to the lane path management engine 201 such as map data, and use the integrated data to generate user interface presentation data. User interface presentation data can be encoded as Javascript commands that can be executed by a user device to render the user interface. Alternatively, user interface presentation data can be in an XML-based markup language such as XUL, or can be SVG (Scalable Vector Graphics) data. User interface presentation data can also include combinations of formats, such as Javascript supplemented with XML.

The interface engine 215 receives the user interface presentation data from the interface creation engine 210, and delivers it to a user display device 299 for rendering. The interface engine 215 can deliver the user interface presentation data using any appropriate protocol, such as HTTP or a socket-based protocol such as TCP/IP.

The interface engine 215 can then receive, in response to user interaction with the user interface presentation data, indications of one or more altered lane paths. Types of alterations that can be indicated in the user interface presentation data can include moving a node; removing a node and connecting other nodes to complete the path; adding a node and adjusting connections; and any combination. Path alteration is illustrated further in reference to FIG. 4.

Optionally, the interface engine 215 can also receive, in response to user interaction with the user interface presentation data, indications of one or more road obstacles represented in the sensor data and included in the user interface presentation data. Each road obstacle indication can be expressed as a polygon that demarcates the boundary of a road obstacle. Optionally, the road obstacle indication can include a label for the type of road obstacle, such as "road cone," "pothole," "traffic accident," etc. The interface engine 215 can associate the road obstacle indication with the relevant portion of the sensor data. When the lane path management engine 201 subsequently creates user interface presentation data of that relevant portion of the sensor data, the lane path management engine 201 can include a representation of the bounding polygon and/or the label associated with the road obstruction. In addition, the lane path management engine 201 can transmit the road obstacle indications to one or more training systems that can use the road obstacle indications as training data when training a models that detects road obstacles in scenes of an environment.

The alteration to a lane path descriptor can be represented as an indication of the lane path descriptor being changed, combined with the altered lane path descriptor representing modifications to an existing lane path. (Exemplary expressions of path alternations are described in further detail with reference for FIG. 3.) The interface engine 215 can pass the altered paths to the lane path modification engine 220.

The lane path modification engine 220 can update the path data descriptors using the altered path data descriptors received from the interface engine 215. The lane path modification engine 220 can pass the lane path descriptors 225 to other components of the lane path management system 200, including: (i) the lane path data repository 202 to ensure the lane path data repository 202 has the most accurate lane path descriptors; (ii) the training system 250 (described below); and (iii) the on-board system 282 of an autonomous vehicle 280 (also described below).

The training system 250, which is associated with both the lane path management engine 201 and the on-board system 282, can train models 268 used by the on-board system 282 in one or more machine learning models 276. The training system 250 can create trained parameter values 268 using lane path descriptors received from the lane path management engine 201, along with other data available to it.

One example of a machine learning model used to improve the operation of an autonomous vehicle 280 can include a "lane path validity" model that receives a representation of a scene in the vicinity of an autonomous vehicle and predicts one or more valid lane paths that can be safely traversed by the autonomous vehicle.

A lane path validity model can be any appropriate type of machine learning model, for example, a binary classification machine learning model such as a decision tree, a generalized linear model, a multi-layer perceptron (MLP) or other neural network, and so on. The lane path validity machine learning model can use trained parameter values produced by a training system 250. The training system 250 can use features of the roadway and features of the vehicle, as described below.

The output of the lane path validity model can be a value corresponding to the likelihood that a candidate lane path is valid. The system can apply a configurable threshold to the output of the machine learning model, and if the value output by the machine learning model is equal to or above the threshold, the system determines that the lane path is valid; if the value output by the machine learning model is below the threshold, the system determines that the lane path is invalid. The on-board system 282 can use the determination of lane path validity to verify a selected path, as one example use.

Examples of features that can be used to train and execute a lane path validity model can include features related to the vehicle, features related to the roadway, and features related to any agents in the vicinity.

Features related to the vehicle can include the type of vehicle (e.g., car, bus, truck, motorcycle, etc.), motion curvature of the vehicle's current trajectory, history of positions along the vehicle's current trajectory, vehicle heading, history of heading, vehicle speed, history of speed, and vehicle acceleration.

Features related to the roadway can include the number and direction of lanes, the lane paths, the presence of crossing zones, the heading of the crossing zone, the presence and type of intersections (e.g., two-way, four-way, etc.), the presence of traffic signals, the presence of lane obstructions, the presence of traffic signs, and so on.

Features related to the agent can include the type of any agent present (e.g., cyclist, pedestrian, etc.), motion curvature of the agent's current trajectory, history of positions along the agent's current trajectory, agent heading, history of heading, agent speed, history of speed, agent acceleration, and so on.

Other examples of machine learning models used to improve the operation of an autonomous vehicle 280 can include: (i) a model that receives a representation of a scene in the vicinity of an autonomous vehicle, receives sensor data indicating the presence of an obstruction, and predicts that one or lane paths cannot be safely traversed by the autonomous vehicle; and (ii) a model that receives a representation of a scene in the vicinity of an autonomous vehicle and detects obstructions in the scene that would prevent the autonomous vehicle from traveling along an otherwise valid lane path.

The training system 250 includes a training data store 255 that stores the training data used to train the parameter values of each of one or more machine learning model 276. The training data store 255 receives training examples from vehicles operating in the real world and from the lane path management engine 201. For example the training data store 255 can receive a training examples 267 from the vehicle 280 and one or more other agents that are in communication with the training system 250. Each training example 267 can be processed by the training system 250 to generate a new training example used to train one or more machine learning models 276. The training examples 267 include a model input for at least one machine learning model 276. For example, the training examples 267 can include lane paths included in the scene data 273 created by the on-board system 282.

The training engine 260, also within the training system 250, can retrieve from the training data store 255 training examples 257, such as lane path descriptors. The training engine uses the training examples 257 to update the model parameters of one or more machine learning models 262 (such as the examples listed above), and to provide the updated model parameters 262 to the model parameters store 265. Once the parameter values of the model 262 have been fully trained, the training system 250 can send the trained parameter values 268 to the on-board system 282, e.g., through a wired or wireless connection.

The training system 250 is typically hosted within a data center 245, which can be a distributed computing system having hundreds or thousands of computers in one or more locations.

The on-board system 282 is located on-board a vehicle 280 and is configured to safely navigate the vehicle through the environment. Accordingly, it includes components used to detect and to understand the environment, then to plan a safe path. The on-board system 282 is composed of hardware and software components, some or all of which are physically located on-board a vehicle 282. The components of the on-board system 282 are described in more detail below.

In some cases, the on-board system 282 can make fully-autonomous or partly-autonomous driving decisions (i.e., driving decisions taken independently of the driver of the vehicle 280), present information to the driver of a vehicle 280 to assist the driver in operating the vehicle safely, or both. For example, in response to determining that a lane path requires merging into another lane, to merge safely (avoiding other vehicles), the on-board system 282 might apply the brakes or the accelerator while altering the heading of the vehicle 280.

Although the vehicle 280 in FIG. 2 is depicted as an automobile, and the examples in this document are described with reference to automobiles, in general the vehicle 280 can be any kind of vehicle. For example, besides an automobile, the vehicle 280 can be another kind of autonomous vehicle that travels along a roadway, e.g., a truck, a motorcycle, a robot, or another agent that performs autonomous navigation. Moreover, the on-board system 282 can include components additional to those depicted in FIG. 2 (e.g., a collision detection system or a navigation system).

To enable the safe control of the autonomous vehicle 280, the on-board system 282 includes a sensor system 270 which enables the on-board system 282 to "see" the environment in the vicinity of the vehicle 280. More specifically, the sensor system 270 includes one or more sensors, some of which are configured to receive reflections of electromagnetic radiation from the environment in the vicinity of the vehicle 280. For example, the sensor system 270 can include one or more laser sensors (e.g., LIDAR laser sensors) that are configured to detect reflections of laser light. As another example, the sensor system 270 can include one or more radar sensors that are configured to detect reflections of radio waves. As another example, the sensor system 270 can include one or more camera sensors that are configured to detect reflections of visible light.

The sensor system 270 continually (i.e., at each of multiple time points) captures raw sensor data which can indicate the directions, intensities, and distances travelled by reflected radiation. For example, a sensor in the sensor system 270 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 270 can also include a combination of components that receive reflections of electromagnetic radiation, e.g., LIDAR systems that detect reflections of laser light, radar systems that detect reflections of radio waves, and camera systems that detect reflections of visible light.

The sensor subsystems 270 or other components of the vehicle 280 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 270 classifies one or more groups of raw sensor measurements as being measures of respective other agents, the sensor subsystems 270 can compile the raw sensor measurements into a set of raw data 271, and send the raw data 271 to a data representation system 272.

The data representation system 272, also on-board the vehicle 280, receives the raw sensor data 271 from the sensor system 270 and additional data that characterizes the environment, i.e., roadgraph data that identifies lane paths, marked crossing zones and other features of the environment, within roadways in the environment and generates scene data 273 that includes features that characterize the agents and environment in the vicinity of the vehicle 280.

The data representation system 272 can provide the scene data 273 to a prediction system 274. The prediction system 274 on-board the vehicle 280 uses scene data and one or more machine learning models 276 (configured by trained parameter values 268) to generate prediction data 278 used by a planning system within the on-board system to guide the vehicle. For example, the prediction system 274 can contain a machine learning models that receives a representation of a scene in the vicinity of an autonomous vehicle and predicts one or more valid lane paths that can be safely traversed by the autonomous vehicle; a model that receives a representation of a scene in the vicinity of an autonomous vehicle, receives sensor data indicating the presence of an obstruction, and predicts that one or more lane paths cannot be safely traversed by the autonomous vehicle; or both.

The on-board system 282 can continually generate prediction data 278 for agents in the vicinity of the vehicle 280, for example, at regular intervals of time (e.g., every 0.1 seconds). The on-board system 282 can provide the prediction data 278 to a planning system 279.

When the planning system 279 receives the prediction data 278, the planning system 279 can use the prediction data 278 to make fully-autonomous driving decisions, i.e., to update a planned trajectory for the vehicle 280. For example, the planning system 279 can generate a fully-autonomous plan to navigate the vehicle 280 around an obstruction by first using predictions of one more lane paths that can be safely traversed by the vehicle 280, then selecting a trajectory consistent with that path. In another example, the planning system 279 can generate a fully-autonomous plan to navigate the vehicle 280 around an obstruction by first using predictions of one more lane paths that cannot be safely traversed by the vehicle 280, then selecting among the remaining available lane paths—that is, those not predicted to be unsafe—then determining a trajectory consistent with the selected (safe) lane path.

The fully-autonomous driving decisions generated by the planning system 279 can be implemented by a control system of the vehicle 280. For example, in response to receiving a fully-autonomous driving decision generated by the planning system 279 which indicates that the brakes of the vehicle should be applied, the control system may transmit an electronic signal to a braking control unit of the vehicle. In response to receiving the electronic signal, the braking control unit can mechanically apply the brakes of the vehicle. In addition, the planning system 279 can use the lane path data provided by the lane path management engine 201 to select lane paths to be traversed by the autonomous vehicle 280.

Figure 3:
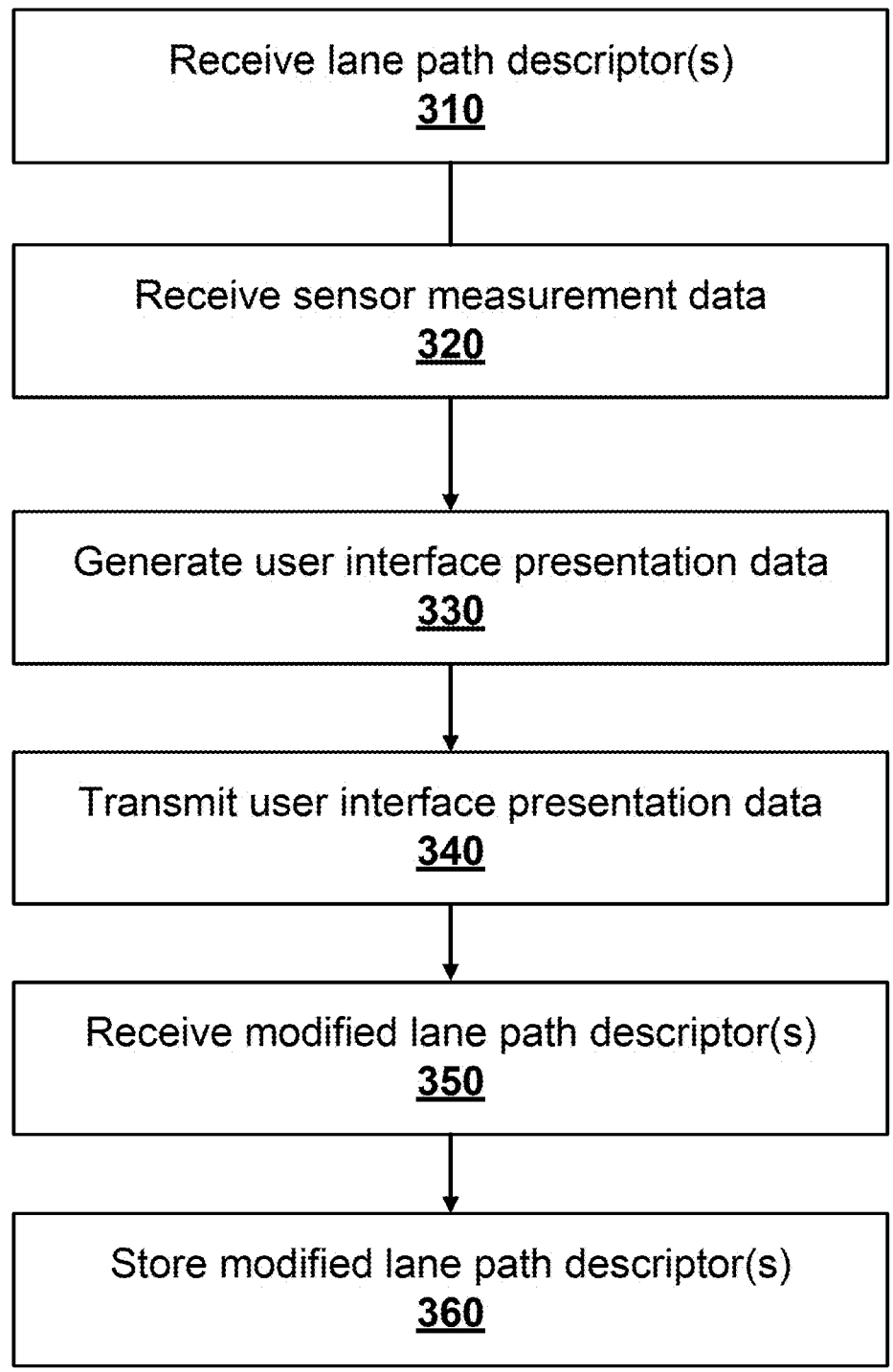
FIG. 3 is a flow diagram of an example process to modify lane path descriptors.

FIG. 3 is a flow diagram of an example process to modify lane path descriptors.

In step 310, the system receives lane path descriptors. The lane path descriptors can be any geometric representation of a lane through space. For example, a lane path can be expressed as a collection of nodes, where each node is represented by the coordinates of its location in space, and a set of interconnections among nodes. The coordinates can be absolute, such as latitude and longitude, or relative to an origin point that is represented by absolute coordinates—that is, the coordinates specify offsets from the origin coordinate. The interconnections among nodes can be expressed as pairs, such as (N1, N2) to indicate that node N1 is directly connected to node N2. An interconnection between two nodes in a lane path representation can represent a segment connecting the coordinates represented by the two nodes.

In step 320, the system retrieves sensor data that describes objects in the scene relevant to the lane path. An example of a visual representation of such sensor data was shown in panes 130 and 140 of FIG. 1. The potential sources of sensor data were described in reference to FIG. 2.

In step 330, the system generates user interface presentation data. The user interface presentation data can include information descriptive of the panes to be presented on a user device. For example, the user interface presentation data can include all or some subset of: (i) data relevant to rendering the sensor data in one pane; (ii) data relevant to illustrating lane paths, including nodes and obstructions in a second pane; (iii) data relevant to node connections in a third pane; (iv) a list of nodes in a fourth pane; (iv) optional data relevant to marking obstacles, for example, with bounding polygons in one or more of the panes or in a separate pane, and (v) one or more user interface elements (e.g., buttons) that allow a user to confirm actions, undo an action, cancel all actions, and so on. The user interface presentation data can also include representations of other data relevant to altering lane paths.

The user interface presentation data can be encoded in any in format appropriate for describing a user interface, as described in reference to FIG. 2. The user interface presentation data can be a set of commands that, when delivered to and rendered by a user device, cause a user interface, such as the interface of FIG. 1, to be displayed.

In step 340, the system transmits the user interface presentation data to a user display device. The transmission can occur using any protocol capable of carrying a user interface presentation. For example, the user interface presentation data can be transmitted over HTTP (or HTTPS), or using a networking protocol such as TCP/IP or UDP.

In step 350, the system receives an indication of one or more modified lane paths. The system can receive the indication over any protocol capable of carrying data, such as those described in reference to step 340.

The indication can be created in response to a user modifying user interface presentation data that is displayed on a user display device. Changes to lane paths indicated by alterations to user interface presentation data can reflect changes to nodes (add, delete or move), changes to how nodes are connected (such as a lane path being changed from traversing node A to node B to traversing node A to node C, where nodes A, B and C all previously existed) or to both.

The description of a modified lane path can include an indication of the lane path being modified, and an indication of the modification. The indication of the lane path being modified can be any descriptor, such as a character string or integer, which uniquely identifies the lane path.

The indication of the modification can be an indication of the change made to a lane path, such as adding, moving or deleting a node, and adjusting the nodes traversed by the lane path. The indication of the modification to the lane path can be expressed in any format sufficient to describe the change. For example, the indication can take a format such as "Path: <path indicator>; node <node indication> <action type>; new coordinates: <x_coordinate, y_coordinate>." For example, "Path: P; node N3 MOVED; new coordinates: (X2, Y2)," which can indicate that in path P, node N3 has moved, and the new coordinates are (X2, Y2) (for some appropriate values of X2 and Y2). In this example, action types can include ADD, MOVE and DELETE. (The DELETE action does not require new coordinates.)

In addition, the indication of the modification can be an indication of a new obstruction. For example, a user can interact with the user interface presentation data to indicate the boundaries of a polygon that surrounds a lane obstruction. The indication can take a format such as "Obstruction: <obstruction indicator>; coordinates: <X1, Y1>, . . . , <Xn, Yn>," where the coordinates mark the vertices of the bounding polygon.

In step 360, the system stores the modified lane path descriptor(s). The system can store the modified lane path descriptors in a lane path data repository, such as the lane path data repository illustrated in FIG. 2.

In addition, the system can store the modified lane path descriptor(s) in a training data store within a training system, as was illustrated in FIG. 2. In this case, the modified lane path descriptors can be used as training examples by a training engine that produces updated model parameters. The updated model parameters can be used by a prediction system within the on-board system of an autonomous vehicle to produce prediction data, and the prediction data can be used by a planning system, also within the on-board system, to guide the proper operation of the autonomous vehicle by choosing preferred lane paths.

The prediction system can include one or more machine learning models such as a path prediction system or a lane path validity system, as described in reference to FIG. 2.

Figure 4:
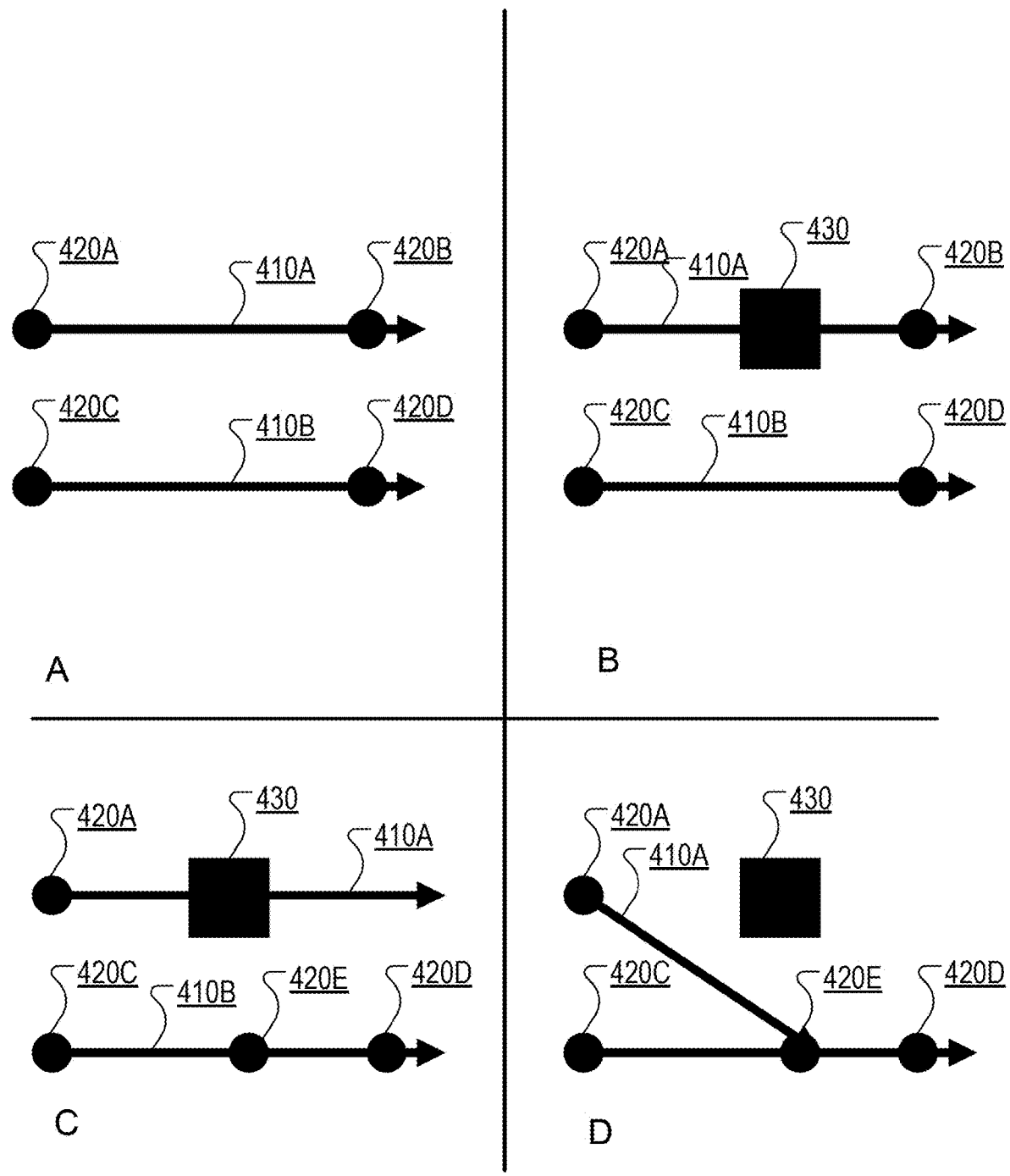
FIGS. 4 and 5 are four-pane illustrations of lane path descriptor modifications.

FIG. 4 is a four-pane illustration of lane path descriptor modifications. The four panes of FIG. 4 can represent user interface presentation data that is rendered, at different times, in a user interface, such as panel 130 of FIG. 1.

Panel A shows a representation of user interface presentation data that contains lane path 410a with two nodes 420a and 420b, and lane path 410B also with two nodes, 420c and 420d. In this panel, there are no obstructions in either lane path.

In panel B, a new lane obstruction 430, for example, one newly indicated by a user interacting with user interface presentation data, is present in the user interface presentation data and occludes lane path 410*a*, rendering it unpassable. An indication of the new lane obstruction can be sent to a lane path management engine, and can take the form (as described in reference to FIG. 3): "Obstruction: obstruction_1; coordinates: <Xa, Ym>, <Xb, Ym>, <Xb, Yn>, <Xa, Yn>", where the coordinates mark the four corners of the square boundary surrounding the obstruction.

Next, in panel C, the lane path modification system has received an indication, created in response to a user interacting with the user interface presentation data, to delete node 420*b* as it is no longer reachable because of the obstruction 430. In addition, also in response to the user interacting with user interface presentation data, the system has received an indication that it should introduce a new node 420*e* in lane path 410*b*. The format of the indicators was described in reference to FIG. 2.

In response, the lane path modification system can update the lane path descriptor associated with the lane path 410*b*, removing the node 420*b*. Further, since the lane path 410*a* now contains only a single node, the lane path modification system can include in the lane path descriptor associated with lane path 410*a* and indication that the lane path 410*a* is incomplete. An autonomous vehicle evaluating the potential use of lane path 410*a* can then determine from the lane path descriptor that the lane path is incomplete and exclude the lane path 410*a* from consideration. Alternatively, the lane path modification system can exclude lane path descriptors for incomplete lane paths from data transmitted to a training system or to an autonomous vehicle.

Finally, in panel D, the lane path modification system has received an indication (the format of the indicators was described in reference to FIG. 2.) created in response to a user interacting with the user interface presentation data to route lane path 410*a* such that it traverses, in order, nodes 420*a*, 420*e* and 420*d*, causing lane path 410*a* to merge into lane 410*b*. This merge allows a vehicle that starts at node 420*a* to safely traverse the environment, ending at node 420*d*. In response, the lane path modification system can update the lane path descriptor associated with lane path 410*a* to indicate that it now includes (in order) nodes 420*a*, 420*e* and 420*d*. In addition, the lane path modification system can include in the lane path descriptor an indication that lane path 410*a* merges into lane path 420*b*. The lane path modification system can store the updated lane path descriptor in a lane path data repository, transmit the updated lane path descriptor to a training system, and transmit the updated lane path descriptor to one or more autonomous vehicles.

Figure 5:
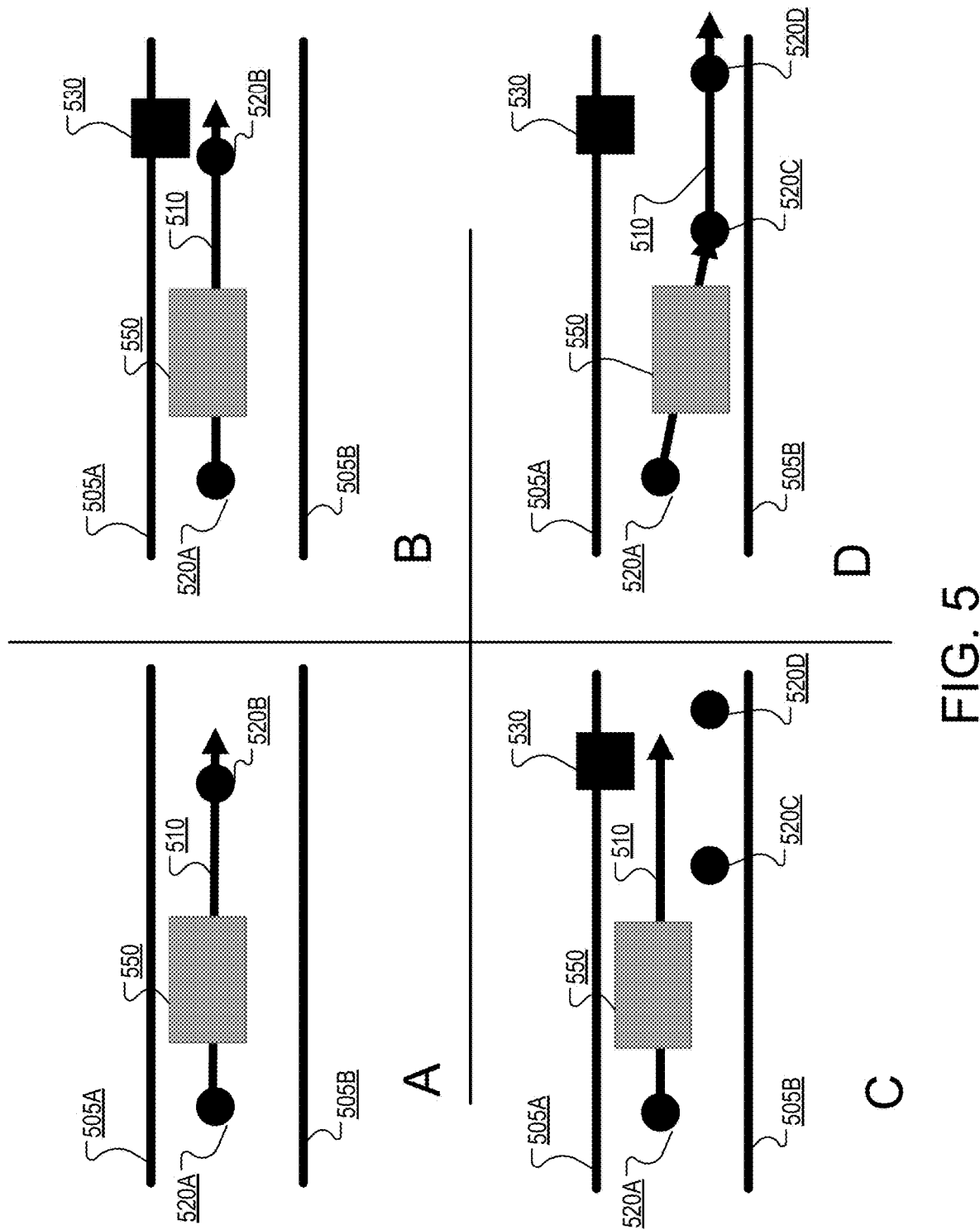

FIG. 5 is a second four-panel illustration of a lane path modification. The four panes of FIG. 5 can represent user interface presentation data that is rendered in a user interface, such as panel 130 of FIG. 1.

Panel A show a representation 510 of user interface presentation data that contains two nodes 520A and 520B. Panel A also show a representation of user interface presentation data representing lane boundaries 505A, 505B, and the outline of an exemplary vehicle 550.

In panel B, an obstruction 530, such as a pothole, has been introduced into the lane with lane boundaries 505A and 505B. For example, the obstruction can be created by a user interacting with user interface presentation data as described previously. This obstruction 530 would impede the operation of the vehicle 550.

In panel C, by interacting with the user interface presentation data, the user has created two additional nodes, 520C and 520D, and deleted node 520B. The change to the user interface presentation data causes the lane path modification system to receive a corresponding indication of two additional nodes, 520C and 520D, and an indication to delete node 520B.

In response, the lane path modification system can update the lane path descriptor associated with the lane path 510, removing the node 520*b*. Further, since the lane path 510 now contains only a single node, the lane path modification system can include in the lane path descriptor associated with lane path 510 an indication that the lane path 510 is incomplete. An autonomous vehicle evaluating the potential use of lane path 510 can then determine from the lane path descriptor that the lane path is incomplete and exclude the lane path 510 from consideration. Alternatively, the lane path modification system can exclude lane path descriptors for incomplete lane paths from data transmitted to a training system or to an autonomous vehicle. In addition, the lane path modification system can create and store descriptors for the newly created nodes 520*c* and 520*d*, although those nodes are not yet included in any lane paths.

In panel D, a user interacting with user interface presentation data has updated lane path 510 such that it passes through (in order) nodes 520A, 520C and 520D to avoid the obstacle 530. In response to the change in the user interface presentation data, the lane path modification system can receive an indication to update the lane path descriptor for the reconfigured lane path 510 that passes through (in order) nodes 520A, 520C and 520D to avoid the obstacle 530. (Note that while the lane path has changed geometry, it still remains entirely within the original lane.) In response to receiving the indication, the lane path modification system can update the lane path descriptor associated with the modified lane path 510 to indicate that it now includes (in order) nodes 520A, 520C and 520D. The lane path modification system can store the updated lane path descriptor in a lane path data repository, transmit the updated lane path descriptor to a training system, and/or transmit the updated lane path descriptor to one or more autonomous vehicles.

Figure 6:
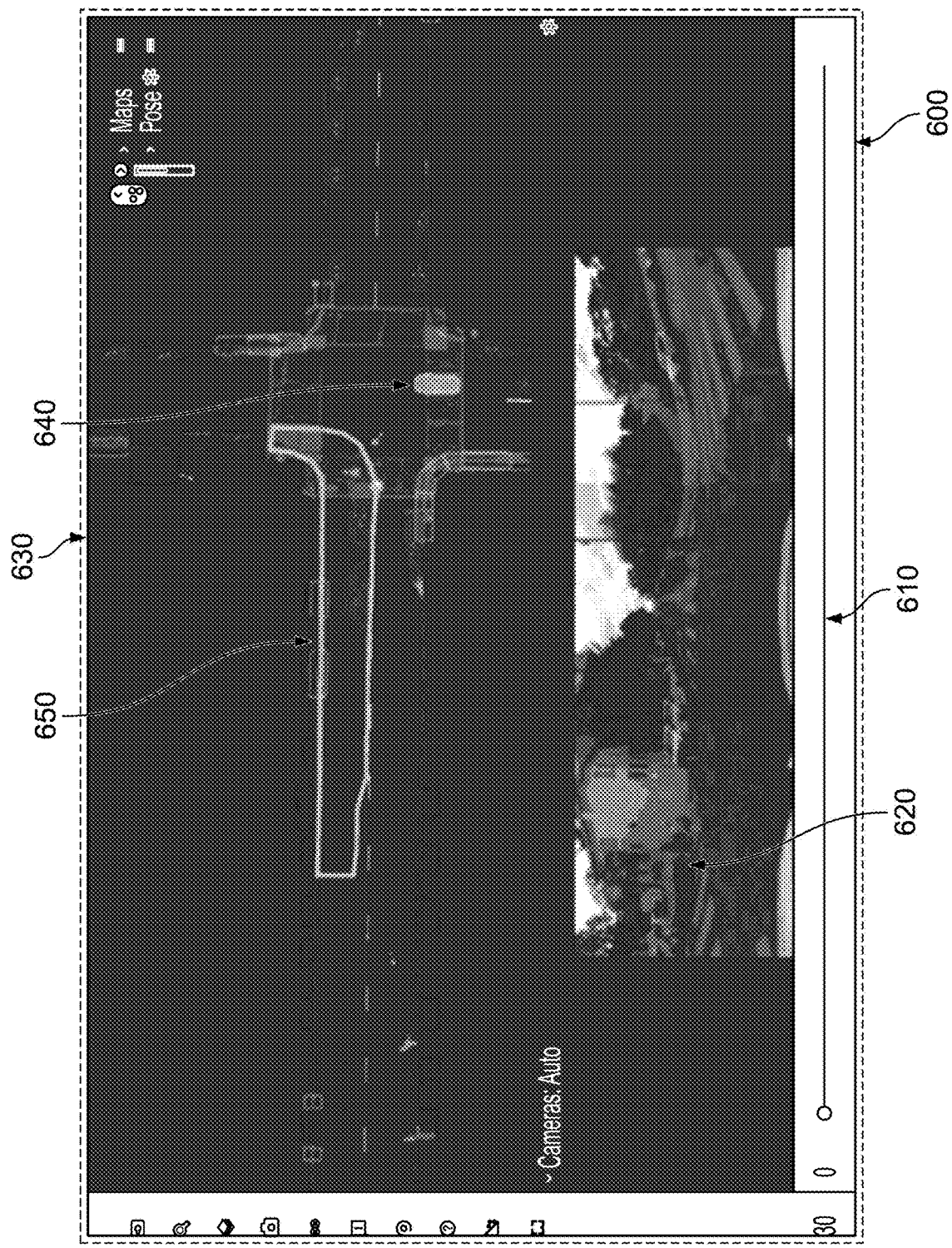
FIG. 6 is an illustration of a user interface generated by a system that modifies lane path descriptors.

FIG. 6 is a second illustration of a user interface generated by a lane path management system that modifies lane path descriptors. The illustration is based on user interface presentation data generated by a lane path management system such as the lane path management system described with reference to FIG. 2. As described with reference to FIG. 1, a lane path management system can generate user interface presentation data and provide the user interface presentation data to a user device to cause the user device to display a user interface that represents the user interface presentation data. The user interface presentation data 600 can include data describing one or more panes that allow a user to review and alter lane paths and information related to lane paths, such as polygons that mark the boundaries of road obstructions.

In this figure, the user interface presentation data includes two panes. The first pane 610 includes sensor data and the second pane graphically represents the area for which sensor data is illustrated. As illustrated in FIG. 1, the user interface presentation data can include additional panes that are not illustrated in FIG. 6.

As in FIG. 1, the first pane 610 displays user interface presentation data that includes representations of sensor data collected by one or more autonomous vehicles that have traversed, or are currently traversing, an environment, or by other sensors measuring the environment. This user interface presentation data represented in this pane enable a user who is reviewing the lane paths to understand the paths in the context of the environment. Specifically, the pane includes sensor data indicating a lane obstruction 620.

A second pane 630, includes a representation of user interface presentation data produced by the system 100. The user interface presentation data represents the area for which sensor data is illustrated in pane 610. The pane is a top-down presentation of the user interface presentation data that represents sensor data gathered from a scene in an environment. The representation includes depictions of multiple elements of the scene, including a vehicle 640 and a polygon 650 surrounding the obstruction 620 shown in the sensor data.

The polygon 650 can be created by a user interacting with the user presentation data. When interacting with the user interface presentation data, a user can specify the boundaries of the polygon by, for example, using mouse clicks. In response to receiving a mouse click corresponding to a point on the boundary of the polygon, the lane path management system can update the points in the polygon that mark the obstruction. In some implementations, control points can be created in the 3D space where the z-axis values matches the elevation of the roadgraph being represented in the user interface presentation data. In response to receiving the polygon 650 marking the road obstruction, the lane path management system can update the corresponding sensor data, as previously described in reference to FIG. 2.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving data representing a sensor measurement, generated by one or more sensors, of a scene in an environment;
    receiving data defining a set of valid lane paths in the scene in the environment, each valid lane path representing a path through the scene that can be traversed by a vehicle;
    receiving data indicating that at least one valid lane path in the scene has become an invalid lane path, each invalid lane path representing a path that contains an obstruction that prevents a vehicle from traversing a path through the scene represented by the invalid lane path;
    providing user interface presentation data to a user device that causes the user device to display a user interface, the user interface comprising:
        (i) a first display area that displays a first visual representation of the sensor measurement; and
        (ii) a second display area that displays a second visual representation of the at least one invalid lane path;
    receiving a user input modifying the second visual representation of the at least one invalid lane path such that the modified visual representation avoids the obstruction;
    generating, using the user input, a lane path that can be traversed by a vehicle; and
    in response to receiving the user input modifying the second visual representation, modifying the set of valid lane paths of the scene in the environment to include the generated lane path.

2. The method of claim 1 wherein each of the lane paths is defined by a lane path descriptor that specifies:
- a plurality of nodes comprising a start node and an end node;
- the start node represents the beginning of the lane path and the end node represents the end of the lane path; and
- one or more directed edges connecting the start node to the end node.

3. The method of claim 2 where the user input removes at least one of the plurality of nodes of the invalid lane path.

4. The method of claim 2 where the user input adds at least one node to the plurality of nodes of the invalid lane path.

5. The method of claim 2 where the user input modifies the location of at least one node of the plurality of nodes of the invalid lane path.

6. The method of claim 1 further comprising:
- receiving a user input representing vertices of a polygon enclosing at least a portion of the sensor data; and
- in response, associating the enclosed at least a portion with a label that identifies the enclosed portion as a measurement of a roadway obstruction.

7. The method of claim 1 where the first display area displays the first visual representation of the sensor measurement as a top-down representation.

8. A system comprising one or more computers and one or more storage devices storing instructions that when executed by the one or more computers cause the one or more computers to perform operations comprising:
- receiving data representing a sensor measurement, generated by one or more sensors, of a scene in an environment;
- receiving data defining a set of valid lane paths in the scene in the environment, each valid lane path representing a path through the scene that can be traversed by a vehicle;
- receiving data indicating that at least one valid lane path in the scene has become an invalid lane path, each invalid lane path representing a path that contains an obstruction that prevents a vehicle from traversing a path through the scene represented by the invalid lane path;
- providing user interface presentation data to a user device that causes the user device to display a user interface, the user interface comprising:
  - (i) a first display area that displays a first visual representation of the sensor measurement; and
  - (ii) a second display area that displays a second visual representation of the at least one invalid lane path;
- receiving a user input modifying the second visual representation of the at least one invalid lane path such that the modified visual representation avoids the obstruction;
- generating, using the user input, a lane path that can be traversed by a vehicle; and
- in response to receiving the user input modifying the second visual representation, modifying the set of valid lane paths of the scene in the environment to include the generated lane path.

9. The system of claim 8 wherein each of the lane paths is defined by a lane path descriptor that specifies:
- a plurality of nodes comprising a start node and an end node;
- the start node represents the beginning of the lane path and the end node represents the end of the lane path; and
- one or more directed edges connecting the start node to the end node.

10. The system of claim 9 where the user input removes at least one of the plurality of nodes of the invalid lane path.

11. The system of claim 9 where the user input adds at least one node to the plurality of nodes of the invalid lane path.

12. The system of claim 9 where the user input modifies the location of at least one node of the plurality of nodes of the invalid lane path.

13. The system of claim 8, the operations further comprising:
- receiving a user input representing vertices of a polygon enclosing at least a portion of the sensor data; and
- in response, associating the enclosed at least a portion with a label that identifies the enclosed portion as a measurement of a roadway obstruction.

14. The system of claim 8 where the first display area displays the first visual representation of the sensor measurement as a top-down representation.

15. One or more non-transitory computer-readable storage media storing instructions that when executed by one or more computers cause the one or more computers to perform operations comprising:
- receiving data representing a sensor measurement, generated by one or more sensors, of a scene in an environment;
- receiving data defining a set of valid lane paths in the scene in the environment, each valid lane path representing a path through the scene that can be traversed by a vehicle;
- receiving data indicating that at least one valid lane path in the scene has become an invalid lane path, each invalid lane path representing a path that contains an obstruction that prevents a vehicle from traversing a path through the scene represented by the invalid lane path;
- providing user interface presentation data to a user device that causes the user device to display a user interface, the user interface comprising:
  - (i) a first display area that displays a first visual representation of the sensor measurement; and
  - (ii) a second display area that displays a second visual representation of the at least one invalid lane path;
- receiving a user input modifying the second visual representation of the at least one invalid lane path such that the modified visual representation avoids the obstruction;
- generating, using the user input, a lane path that can be traversed by a vehicle; and
- in response to receiving the user input modifying the second visual representation, modifying the set of valid lane paths of the scene in the environment to include the generated lane path.

16. The one or more non-transitory computer-readable storage media of claim 15, the operations further comprising:
- receiving a user input representing vertices of a polygon enclosing at least a portion of the sensor data; and
- in response, associating the enclosed at least a portion with a label that identifies the enclosed portion as a measurement of a roadway obstruction.

17. The one or more non-transitory computer-readable storage media of claim 15 where the first display area displays the first visual representation of the sensor measurement as a top-down representation.

18. The one or more non-transitory computer-readable storage media of claim 7 wherein each of the lane paths is defined by a lane path descriptor that specifies:
- a plurality of nodes comprising a start node and an end node;
- the start node represents the beginning of the lane path and the end node represents the end of the lane path; and
- one or more directed edges connecting the start node to the end node.

19. The one or more non-transitory computer-readable storage media of claim 18 where the user input removes at least one of the plurality of nodes of the invalid lane path.

20. The one or more non-transitory computer-readable storage media of claim 7 where the user input removes at least one of the plurality of nodes of the invalid lane path.

* * * * *